E. A. P. OPPEN.
DEVICE FOR OPERATING ELECTROSTATIC HIGH VOLTAGE CURRENT GENERATORS.
APPLICATION FILED SEPT. 16, 1915.

1,199,916.

Patented Oct. 3, 1916.

Inventor
Erich Arnold Paul Oppen
by
John Lotka
Attorney

UNITED STATES PATENT OFFICE.

ERICH ARNOLD PAUL OPPEN, OF COLOGNE-DEUTZ, GERMANY, ASSIGNOR TO MASCHINENFABRIK UND MÜHLENBAUANSTALT G. LUTHER, AKTIEN-GESELLSCHAFT, OF BRUNSWICK, GERMANY, A CORPORATION OF GERMANY.

DEVICE FOR OPERATING ELECTROSTATIC HIGH-VOLTAGE-CURRENT GENERATORS.

1,199,916.   Specification of Letters Patent.   Patented Oct. 3, 1916.

Application filed September 16, 1915. Serial No. 51,016.

*To all whom it may concern:*

Be it known that I, ERICH ARNOLD PAUL OPPEN, a citizen of the German Empire, and resident of Cologne-Deutz, Germany, have invented certain new and useful Improvements in Devices for Operating Electrostatic High-Voltage-Current Generators, of which the following is a specification.

My invention relates to electrostatic generators, such as for instance influence machines, the current generating parts of which are inclosed in a suitable casing and ventilated by a continuously renewed current of air previously reduced to a sufficiently low degree of humidity, to prevent the machine from being affected in its efficiency by the humidity of the atmospheric air.

The object of my invention is to provide for the heating of the air contained in the casing of the machine, without using a special heating device. This aim is attained in heating the air within the casing by the aid of mechanical means, for instance by the action of a fan employed for drawing air into the casing, or by the heat produced by the friction of the moving parts of the machine, such as is produced within the bearings supporting the shaft of the revolving exciting disk. By dispensing with a special heating device I am enabled, on the one hand, to simplify considerably the construction of the machine and to make its working more economical; on the other hand, the operating device according to my invention renders its installation possible in plants liable to catch fire, for instance in grits-purifying plants, such as are used in corn-mills.

Figure 1:
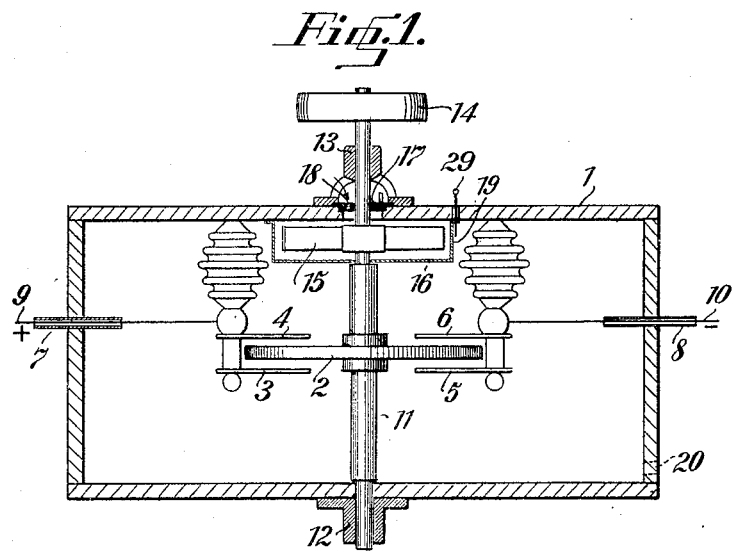
Figure 2:
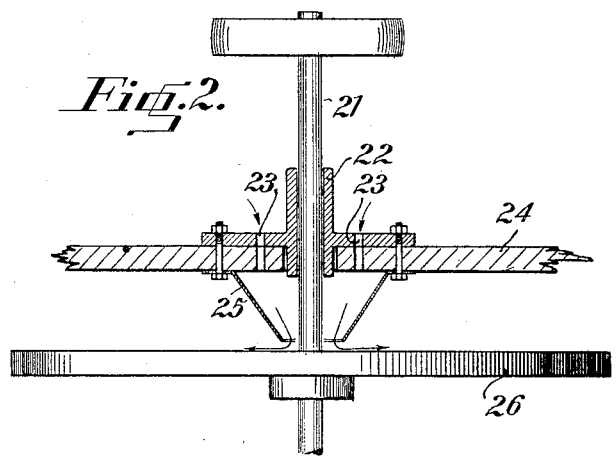

In the accompanying drawings, illustrating an embodiment of my invention by way of example, Figure 1 represents a plan view, partly in section, of an electrostatic generating machine provided with the novel device according to my invention. Fig. 2 is a similar view of a part of a modified construction, shown on a larger scale.

Within the casing 1 an influence machine is disposed having the following structure. A revoluble exciting disk 2 of a well known type, made of insulating material and having metal segments (not shown) embedded therein, is influenced by four charging poles 3, 4, 5, 6, fastened to and insulated from the inner side wall of the casing, two of the said poles being charged positively and the other two poles negatively. The positive and negative electricity is led off by the conductors 9 and 10 respectively, which are passed through insulating tubes 7 and 8 respectively, mounted in the walls of the casing 1. The exciting disk 2 is rigidly mounted on a shaft 11 journaled in bearings 12 and 13 which are preferably disposed on the exterior walls of the casing 1. The shaft 11 may be driven by suitable means, for instance by a pulley 14 and a driving belt not shown. Within the casing 1 and adjacent to one of the side walls of same a fan 15 is provided which is mounted on the shaft 11 and preferably inclosed in a box 16. Air is admitted to the box 16 through an aperture 18 in the side wall of the casing 1, the extent of the aperture 18 being controlled by suitable means, such as a rotary slide 17 or the like. The air leaves the fan box 16, and enters the interior of the casing 1, through the opening 19 adapted to be controlled by means of a slide 29.

When the suction opening 18 of the fan 15 is comparatively small the air in the fan box 16 is beaten repeatedly and carried around by the vanes of the fan; an increase in temperature is thereby produced. An increase of temperature amounting to but a few degrees is sufficient to reduce air saturated with moisture to a degree of humidity of about 75 per cent., whereby an undisturbed operation of the machine is insured. The warmed air entering through the exit 19 of the fan box 16 into the interior of the casing 1 comes in contact with all the parts of the machine during its operation and thereafter escapes through an aperture 20 into the atmosphere. Since the escaping air is more or less saturated with ozone and nitric oxid produced during the generation of the high-tension current, the said air may be subsequently utilized for other purposes.

In the modification shown in Fig. 2 the waste heat of the bearing 22 of the rotating shaft 21 is utilized for heating the air within the casing 24 of the machine. For this purpose, a box or funnel 25 is disposed in front of the inner end of the bearing 22 surrounding the same and the shaft 21 projecting therethrough. The funnel 25 tapers toward the exciting disk 26 and terminates closely to the central part of the latter, leaving a small space between the free edge of the funnel 25 and the face of the disk 26. The air enters the funnel 25 through the passages 23 provided in the wall of the casing 24 in proximity to the bearing 22. When revolving, the disk 26 acts as a fan and draws air into the interior of the casing 24 by centrifugal force, the air being warmed by the waste heat of the bearing 22.

In each of the constructions shown, the heated air within the box 16 or 25 also has an indirect heating action on the air within the casing 1, by the transmission of heat through the walls of said box 16 or 25.

I wish it to be understood that my invention may be carried into effect by other means than those I have herein before described for increasing the temperature of the air mechanically before entering the casing of the electrostatic generator.

What I claim is:—

1. An electrostatic generator, a casing inclosing the same, and provided with an air inlet, a box located within the casing and communicating with said air inlet and also having an outlet to the interior of the casing, and means for heating the air on its way to said outlet.

2. An electrostatic generator which includes an operating shaft, a casing inclosing said generator, a box extending within said casing and provided with an inlet open to the surrounding air and with an outlet leading to the interior of said casing, the said shaft extending through said box, and an air propelling and heating fan mounted on said shaft within said box.

3. An electrostatic generator which includes an operating shaft, a casing inclosing said generator, a box extending within said casing and provided with an air outlet leading to the interior of the casing and with an air inlet, said shaft extending through said box, an air propelling and heating fan mounted on said shaft within said box, and means for regulating the size of the said inlet and of the said outlet.

4. An electrostatic generator, a casing inclosing the same, and provided with an air inlet, a box extending within the casing and communicating with said air inlet and also provided with an outlet through which air may pass from the box into the casing, the wall of said box being adapted to transmit heat from the box to the interior of the casing, and means for heating the air on its way to said outlet.

5. An electrostatic generator, a casing inclosing the same, a box extending within the casing and having an opening for the entrance of air into said box and also an outlet to the interior of the casing, the wall of said box, within the casing, being adapted to transmit heat from the interior of the box to the interior of the casing, and means for heating the air on its way to the said outlet.

In testimony whereof, I have signed this specification.

ERICH ARNOLD PAUL OPPEN.

Copies of this patent may be obtained for five cents each, by addressing the "Commissioner of Patents, Washington, D. C."